US012207002B2

(12) United States Patent
Nandan et al.

(10) Patent No.: US 12,207,002 B2
(45) Date of Patent: Jan. 21, 2025

(54) INTEGRATED CIRCUIT WITH MULTI-APPLICATION IMAGE PROCESSING

(71) Applicant: Texas Instruments Incorporated, Dallas, TX (US)

(72) Inventors: Niraj Nandan, Plano, TX (US); Mihir Mody, Bangalore (IN); Rajasekhar Allu, Plano, TX (US); Manoj Koul, Allen, TX (US); Pandy Kalimuthu, Plano, TX (US); David Stoller, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 118 days.

(21) Appl. No.: 18/194,249

(22) Filed: Mar. 31, 2023

(65) Prior Publication Data

US 2023/0388661 A1 Nov. 30, 2023

Related U.S. Application Data

(60) Provisional application No. 63/345,944, filed on May 26, 2022.

(51) Int. Cl.
*H04N 23/81* (2023.01)
*H04N 23/84* (2023.01)
*H04N 23/88* (2023.01)

(52) U.S. Cl.
CPC ........... *H04N 23/81* (2023.01); *H04N 23/843* (2023.01); *H04N 23/88* (2023.01)

(58) Field of Classification Search
CPC ...... H04N 23/81; H04N 23/843; H04N 23/88; H04N 5/21; H04N 23/80; G06T 3/4015; G06T 1/20
See application file for complete search history.

(56) References Cited

U.S. PATENT DOCUMENTS

| | | | | |
|---|---|---|---|---|
| 5,450,599 | A * | 9/1995 | Horvath | G06F 17/147 382/233 |
| 2012/0086986 | A1* | 4/2012 | Hara | H04N 1/4052 358/3.06 |
| 2015/0207974 | A1* | 7/2015 | Mody | H04N 25/589 348/296 |
| 2017/0132750 | A1* | 5/2017 | Bishop | G06T 1/20 |
| 2018/0352169 | A1* | 12/2018 | Lee | H04N 23/951 |
| 2019/0073176 | A1* | 3/2019 | Holland | G06F 3/14 |
| 2022/0343455 | A1* | 10/2022 | Vavintaparthi | G06T 1/60 |

* cited by examiner

*Primary Examiner* — Hung H Lam
(74) *Attorney, Agent, or Firm* — Brian D. Graham; Frank D. Cimino (57) ABSTRACT

In described examples, an integrated circuit includes first, second, third, and fourth image processing blocks, a data selection circuitry, and a pipeline memory. An input of the first image processing block receives raw image data. An input of the second image processing block is coupled to an output of the first image processing block. An input of the third image processing block is coupled to an output of the second image processing block. A first input of the data selection circuitry is coupled to an output of the first image processing block, and a second input of the data selection circuitry is coupled to an output of the second image processing block. A data input of the pipeline memory is coupled to an output of the data selection circuitry, and an output of the pipeline memory is coupled to an input of the fourth image processing block.

20 Claims, 6 Drawing Sheets

INTEGRATED CIRCUIT WITH MULTI-APPLICATION IMAGE PROCESSING

CROSS-REFERENCE TO RELATED APPLICATIONS

This application claims the benefit of and priority to U.S. Provisional Application No. 63/345,944, filed May 26, 2022, which is incorporated herein by reference.

TECHNICAL FIELD

This application relates generally to image processing, and more particularly to image processing for multiple applications with different color processing requirements.

BACKGROUND

In some examples, color image sensors sense light intensities in a finite number of distinct spectral components. For example, a digital image sensor comprises an array of pixel sensors. Digital sensor arrangements generally use a spatial color filter array (CFA), also referred to as a color filter mosaic (CFM). A CFA is a mosaic of color filters, each color filter positioned over a corresponding pixel sensor to capture a corresponding spectral component of light, so that the output of the image sensor is an array of pixel values. In some examples, three different color filters are used, each corresponding to a red, green, or blue spectral component of light. Each pixel value indicates a raw intensity of light of one of the three colors from the corresponding pixel of the image sensor. Because individual pixels of the image sensor are filtered to each record one of three colors, the data from each pixel does not fully determine the three colors on its own.

To obtain a full-color image, various demosaicing algorithms can be used to interpolate a set of complete red, green, and blue values for each pixel of the image sensor. A demosaicing algorithm is a digital image process used to reconstruct a full color image from color samples output from an image sensor overlaid with a CFA. For example, for a pixel that is overlaid with a green filter of the CFA, the image sensor outputs a raw intensity of green light corresponding to the pixel. A demosaicing algorithm interpolates pixel values of red and blue color for the pixel. Demosaicing can also be referred to as de-mosaicing, demosaicking, debayering, CFA interpolation, or color reconstruction, or the like. Different applications can use different demosaicing algorithms.

SUMMARY

In described examples, an integrated circuit includes first, second, third, and fourth image processing blocks, a data selection circuitry, and a pipeline memory. An input of the first image processing block receives raw image data. An input of the second image processing block is coupled to an output of the first image processing block. An input of the third image processing block is coupled to an output of the second image processing block. A first input of the data selection circuitry is coupled to an output of the first image processing block, and a second input of the data selection circuitry is coupled to an output of the second image processing block. A data input of the pipeline memory is coupled to an output of the data selection circuitry, and an output of the pipeline memory is coupled to an input of the fourth image processing block.

DETAILED DESCRIPTION

In some examples, different applications have different demosaicing requirements. For example, human vision prioritizes color processed to compensate for perceived deficiencies in image capture and display capabilities, or to smooth brighter and darker regions of a subject image. This can result in displayed images that are more visually appealing or perceived as having greater fidelity to source material, at the cost of some information contained in raw captured image data. Machine vision, such as for object detection and other advanced driver assistance systems (ADAS), prioritizes edge information, preferring minimal loss of information contained in raw image data. Different applications (also referred to herein as modalities) can also have different color format requirements, such as Luma, YUV 4:2:0, YUV 4:2:2, hue-saturation-lightness (HSL), or hue-saturation-value (HSV).

In some examples, a video imaging subsystem (VISS) 118 (see FIG. 2) includes circuitry to demosaic raw image data and to perform color processing to select one or more output color formats, as well as circuitry for noise filtering and tone mapping. A single VISS 118 can be used to process image data for human vision, and to process the same image data for machine vision. For example, a VISS 118 can include circuitry for color processing that receives input, via a synchronizer circuit 212 (also referred to as a bypass selection circuit), that bypasses some or all processing blocks between demosaicing and color processing. The synchronizer circuit 212 is used so that a pixel in a line processed for human vision is output by the VISS 118 at the same time as a corresponding pixel in a line processed for machine vision. This enables a single input image data stream to be processed to produce two horizontally synchronized output streams, while avoiding an increase (or enabling a reduction) of horizontal blanking.

An image is made up of multiple lines. A line contains a series of pixels. In some examples, the number of pixels in a line is the width of the image, and the number of lines in the image is the height of the image. Horizontal blanking refers to an idle or blanking time, such as a number of cycles of a system clock, between lines read into an image processing pipeline. The image processing pipeline includes idle portions corresponding to horizontal blanking periods. Accordingly, reduced horizontal blanking corresponds to improved performance efficiency of the VISS 118, and of an image processing system 100 incorporating the VISS 118. Use of the synchronizer circuit 212 and the circuitry for color processing also avoids duplicating other functional blocks of the pipeline while enabling simultaneous processing that uses a single set of camera data to meet requirements for multiple applications.

Figure 1:
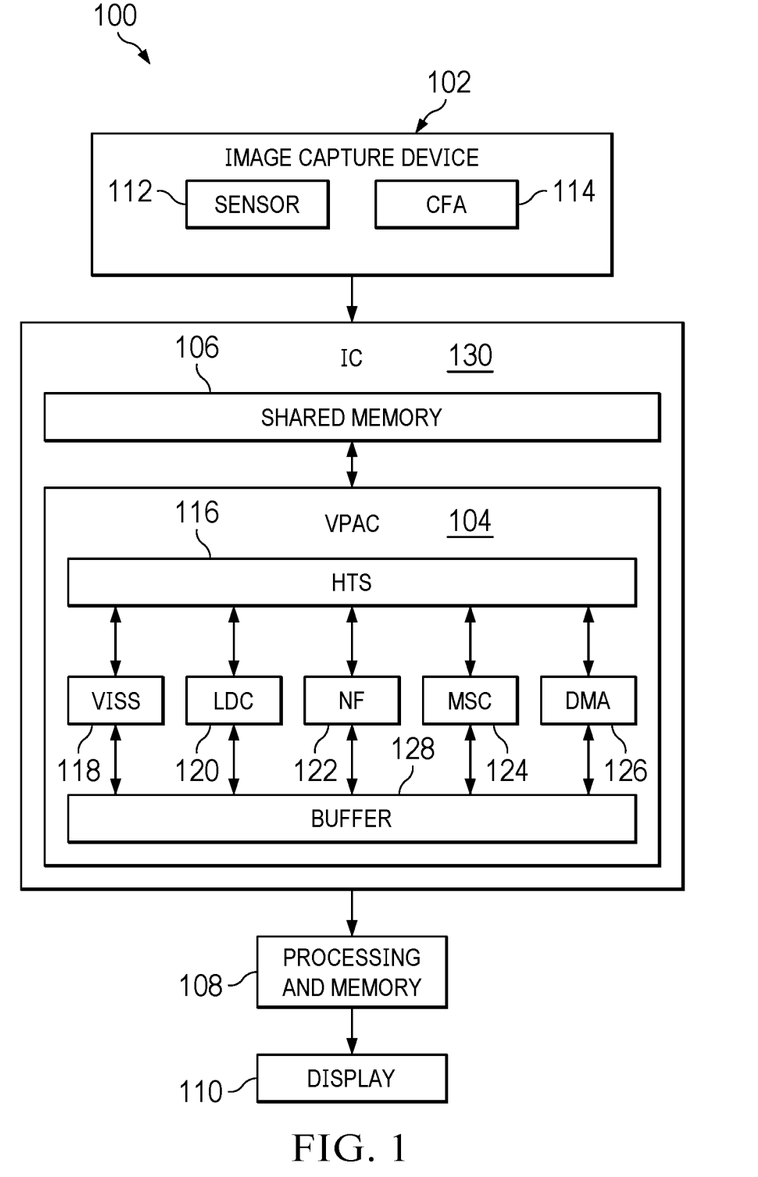
FIG. 1 is a functional block diagram of an example video preprocessing accelerator (VPAC) with a video imaging subsystem (VISS).

FIG. 1 is a functional block diagram of an example image processing system 100. The image processing system 100 may include an image capture device 102, a video preprocessing accelerator (VPAC) 104, a shared memory 106, an additional processing and memory block 108, and a display 110. In an example, the shared memory 106 is a double data rate (DDR) random access memory (RAM). The image capture device 102 includes a sensor 112 and a CFA 114. The VPAC 104 includes a hardware task scheduler (HTS) 116, a set of processing circuits (e.g., a VISS 118, a lens distortion correction (LDC) block 120, a noise filter (NF) block 122, a multi-scalar (MSC) block 124, etc.), a direct memory access (DMA) block 126, and a buffer 128. In some examples, the buffer 128 is a circular buffer. In some examples, some or all of the VPAC 104, the shared memory 106, and/or the additional processing and memory block 108 is included in an integrated circuit (IC), or in multiple ICs on a chip, or in multiple ICs mounted on a printed circuit board (PCB). In the illustrated example, the VPAC 104 and the shared memory 106 are included in an IC 130.

In some examples, the LDC block 120 remaps pixels from a distorted input space to an undistorted input space; and applies perspective transform and/or homography operations. In some examples, the NF block 122 is configured to perform bilateral noise filtering; perform two-dimensional bilateral filtering; and/or use programmable static weights. In some examples, the MSC block 124 can simultaneously scale outputs from one or more input planes; perform Pyramid or inter-octave scale generation; and support one or more scaling ratios. In some examples, the additional processing and memory block 108 includes resources supporting one or more of machine vision, robotics, video surveillance, or ADAS systems.

An output of the image capture device 102 is connected to a data input of the IC 130. Image data received by the IC 130 can be provided to, for example, the shared memory 106 or the VPAC 104. The VPAC 104 is connected to communicate with the shared memory 106. An output of the IC 130 is connected to an input of the additional processing and memory block 108. The additional processing and memory block 108 is connected to provide processed image data to the display 110 for display to a user.

In some examples, the additional processing and memory block 108 includes image analysis circuitry for object detection or image analysis. In some examples, the additional processing and memory block 108 is connected to circuitry for vehicle control, industrial equipment control, or safety functionality (not shown). In some examples, the additional processing and memory block 108 includes circuitry for image processing to prepare for display.

The HTS 116 is connected to schedule tasks to be performed by, and to receive acknowledgments from, the VISS 118, the LDC 120, the NF 122, the MSC 124, and the DMA 126. The buffer 128 is connected to store data and/or instructions received from, and read data and/or instructions out to, the VISS 118, the LDC 120, the NF 122, the MSC 124, and the DMA 126. Thus, the buffer 128 can be used to transfer image data between the VISS 118, the LDC 120, the NF 122, the MSC 124, and the DMA 126. Connections to the HTS 116 and/or to the buffer 128 can use, for example, a bus.

In some examples, the VISS 118 is a line-based image processing component with multiple modes of operation. In an example mode, the VISS 118 receives image data from the image capture device 102, processes the image data, and passes partially processed image data to downstream functional blocks via the buffer 128 for further processing. In another example mode, the DMA block 126 reads image data that has been written to the shared memory 106, and passes the image data to functional blocks including the VISS 118, via the buffer 128, for processing. The DMA block 126 retrieves processed image data from the buffer 126 and writes the processed image data to the shared memory 106. The VISS 118 is further described with respect to FIGS. 2 and 3.

Figure 2:
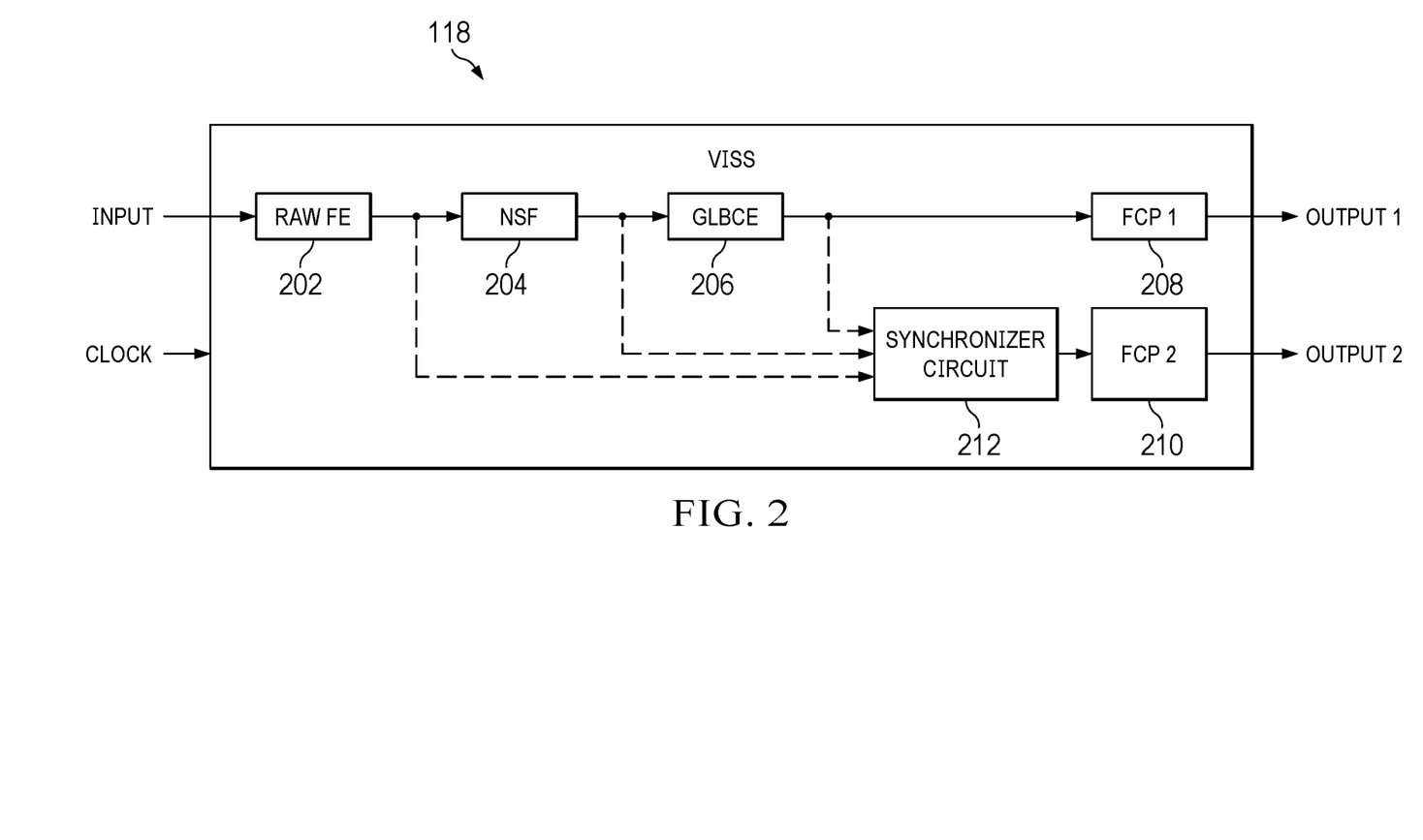
FIG. 2 is a functional block diagram of an example VISS for use in the VPAC of FIG. 1.

FIG. 2 is a functional block diagram of an example VISS 118 for use in the VPAC 104 of FIG. 1. The VISS 118 has a data input (Input), a clock input (Clock), a first output (Output 1), and a second output (Output 2), and includes a set of processing circuits (e.g., a raw front end (FE) 202, a noise filter (NSF) 204, a global and local brightness contrast enhancement (GLBCE) block 206, a first flex color processing (FCP 1) block 208, a second flex color processing (FCP 2) block 210, etc.), and a synchronizer circuit 212. The clock input receives a clock signal from a system clock (not shown). The raw FE 202, the NSF 204, the GLBCE block 206, the FCP 1 block 208, and the FCP 2 block 210 are clocked by the clock signal in streaming fashion, so that circuits that process a pixel or block in the pipeline in one clock cycle process a next pixel or block in the pipeline in a sequentially next clock cycle.

An input of the raw FE 202 is connected to the data input to receive the image data. An output of the raw FE 202 is connected to an input of the NSF 204 and a first input of the synchronizer circuit 212. An output of the NSF 204 is connected to an input of the GLBCE block 206, and to a second input of the synchronizer circuit 212. An output of the GLBCE block 206 is connected to an input of the FCP 1 block 208 and a third input of the synchronizer circuit 212. An output of the FCP 1 block 208 is connected to the first output (Output 1) of the VISS 118. An output of the synchronizer circuit 212 is connected to an input of the FCP 2 block 210. An output of the FCP 2 block 210 is connected to the second output (Output 2) of the VISS 118.

In some examples, the raw FE 202 implements wide dynamic range (WDR) merge, defect pixel correction (DPC), lens shading correction (LSC), decompounding, 3A (auto-focus, auto-exposure, and auto-white balance) statistics, and/or white balance. The NSF 204 implements a Bayer domain spatial noise filter. The GLBCE block 206 performs adaptive local tone mapping. The FCP 1 and FCP 2 blocks 208 and 210 perform various combinations of demosaicing, color correction, color space conversion, and/or gamma conversion. In an example, the FCP 1 block 208 and Output 1 provide output corresponding to human vision, and the FCP 2 block 210 and Output 2 provide output corresponding to machine vision. In some examples, FCP 1 208 and FCP 2 210 use a single set of image sensor data to provide outputs corresponding to different applications.

In some examples, each of Output 1 and Output 2 includes multiple output lines. Accordingly, the FCP 1 and FCP 2 blocks 208 and 210 each include multiple outputs, and simultaneously output processed pixels in multiple different color formats, so that processed versions of individual pixels or blocks are output by both the FCP 1 and FCP 2 blocks 208 and 210 in same clock cycles. The FCP 1 block 208 can output pixels in color formats that are the same as or different from color formats in which the FCP 2 block 210 outputs pixels. Output of the FCP 1 and FCP 2 blocks 208 and 210 in different color formats is further described with respect to FIG. 3. In some examples, the FCP 1 block 208 and the FCP 2 block 210 each provides to Output 1 or Output 2, respectively, five color channels of data. In some examples, the FCP 1 block 208 and/or the FCP 2 block 210 provide luma 8-bit, chroma 8-bit, luma 12-bit, chroma 12-bit, or saturation data.

Different applications can have different input requirements. For example, as described above, processing for machine vision prefers minimal edge information loss with respect to raw captured image data. This means that, in some applications, it is detrimental for input to the FCP 2 block 210 to be processed by the NSF 204 or the GLBCE block 206. Accordingly, input to the FCP 2 block 210 can bypass (or skip) the GLBCE block 206, or the NSF 204 and the GLBCE block 206, via the synchronizer circuit 212.

Figure 3:
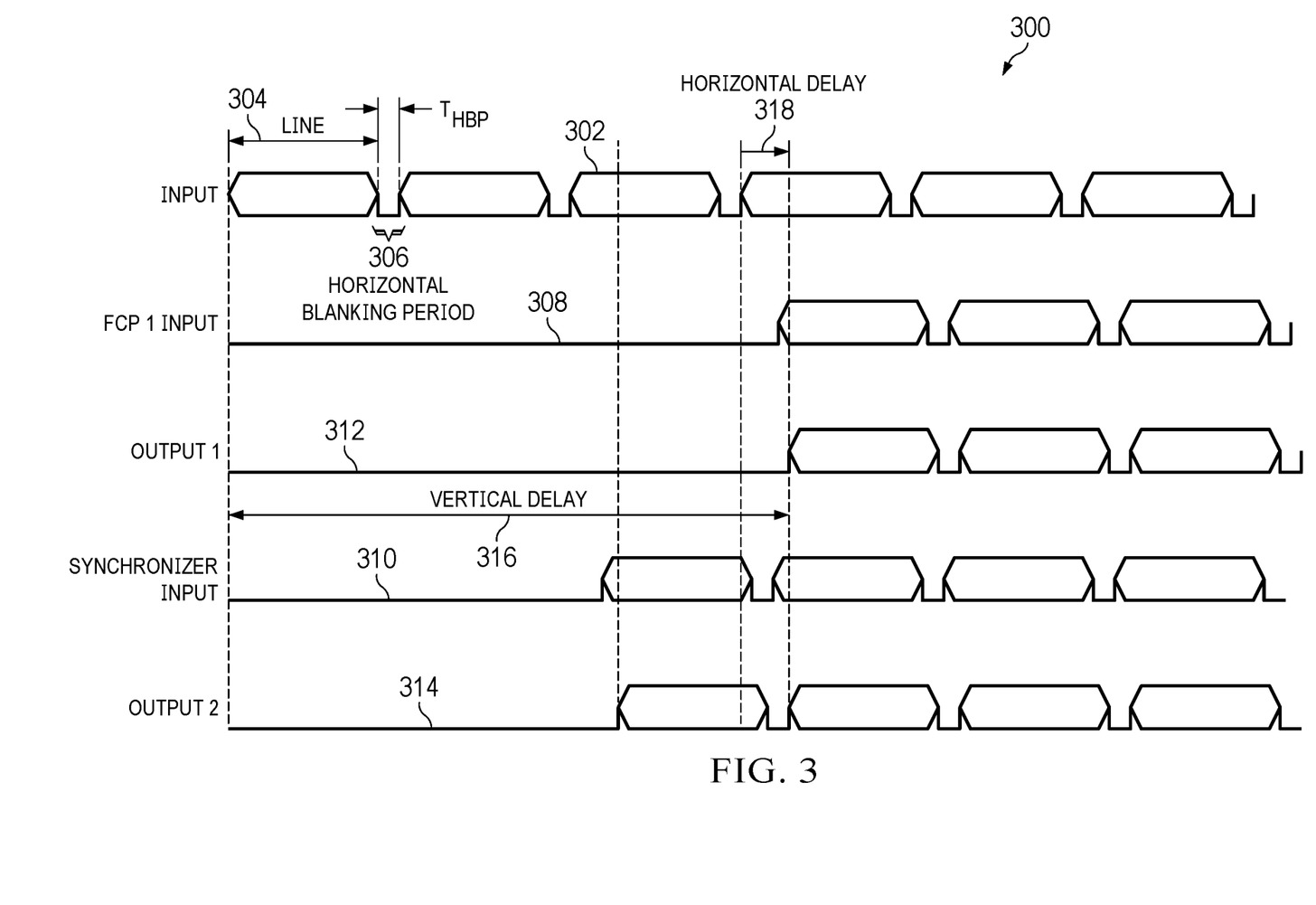
FIG. 3 is a timing diagram showing example timings of signals at Input, Output 1, and Output 2.

FIG. 3 is a timing diagram 300 showing example timings of signals at Input 302, Output 1 312, and Output 2 314. Input 302 corresponds to Input, i.e. the data input of the VISS 118 as shown in FIG. 2. Output 1 312 and Output 2 314 respectively correspond to the first and second outputs of the VISS 118, i.e. Output 1 and Output 2, as shown in FIG. 2.

The periods of Input 302 with eye shapes correspond to the VISS 118 receiving image data corresponding to a line 304 of an image (valid line data). Input 302 being low (no eye shape) corresponds to a horizontal blanking period 306 between image data reception periods. A horizontal blanking period 306 lasts for a time $T_{HBP}$. FCP 1 input 308 is the input of the FCP 1 block 208, and synchronizer input 310 is the input of the synchronizer circuit 212 (which provides the input of the FCP 2 block 210). FCP 1 input 308 or synchronizer input 310 having an eye shape corresponds to the respective functional block receiving a partially processed line of image data 304. Output 1 312 or Output 2 314 having an eye shape corresponds to output of a processed line of image data 304 by the FCP 1 block 208 or the FCP 2 block 210, respectively.

A vertical delay 316 is a time (in an example, measured in a number of lines of image data) from the beginning of receiving a line of image data 304 at Input 302 to a beginning of outputting the line, such as at Output 1 312. In some examples, vertical delay varies in response to types of processing included in an image processing pipeline such as the VISS 118. A horizontal delay 318 is a time (in an example, measured in clock cycles) to the beginning of outputting a processed line of image data 304 from the FCP 1 block 208 or the FCP 2 block 210 from an immediately previous beginning of receiving a line of image data 304 at Input 302. The received line of image data 304 and the processed line of image data 304 used to determine horizontal delay 318 can be the same line of image data 304 or different lines of image data 304 (for example, a third received line of image data 304 and a seventh received line of image data 304). Accordingly, a vertical delay 316 corresponding to Output 1 312 can be different from a vertical delay 316 corresponding to Output 2 314, while at the same time, the horizontal delays 318 corresponding to Output 1 312 and Output 2 314 are the same or nearly the same. Herein, horizontal delays corresponding to Output 1 312 and Output 2 314 being nearly the same means that an absolute value of a difference between the horizontal delays 318 corresponding to Output 1 312 and Output 2 314 is less than or equal to $T_{HBP}$.

In some examples, the VISS 118 writes its outputs to the buffer 128, and the LDC 120, NF 122, and MSC 124 read from, and write their respective outputs to, the buffer 128. In some examples, functional blocks require that a preceding pipeline result for all color channels corresponding to a line be written to the buffer 128 before the functional block will read from the buffer 128 to continue image processing. With respect to the VISS 118, this means that a downstream functional block will wait for both a processed first line of image data 304 to be provided at Output 1 312 and a processed second line of image data 304 to be provided at Output 2 314 before the downstream function block reads the combined outputs and proceeds with image processing. In some examples, the processed first line of image data 304 corresponds to a different line of image data 304 from the processed second line of image data 304. In other words, some difference between vertical delays 316 corresponding to Output 1 312 and Output 2 314 is acceptable. In some examples, color channel completeness requirements are set earlier or later with respect to writing to or reading from the buffer 128, and similar conditions may apply.

A horizontal delay 318 corresponding to Output 1 312 is a first horizontal delay ($delay_{H1}$). A horizontal delay 318 corresponding to Output 2 314 is a second horizontal delay ($delay_{H2}$). In some examples, if $|delay_{H1} - delay_{H2}| > T_{HBP}$, then downstream functional blocks are not able to read combined outputs to proceed with image processing as often as Input 302 receives new lines. Processing is delayed by a number of cycles equal to the number of cycles by which $|delay_{H1} - delay_{H2}| > T_{HBP}$. This may lead to, for example, a reduced input rate, or use of a large buffer with a reduced processing rate. This issue can be avoided by horizontally synchronizing Output 1 312 with Output 2 314.

Output 1 312 is horizontally synchronized with Output 2 314 if the horizontal delay 318 of Output 1 312 is the same or nearly the same as the horizontal delay 318 of Output 2 314. In some examples, this means that where lines of image data 304 are a number L pixels long, an Nth pixel of the first line of image data 304 is output at the same time as, or within $T_{HBP}$ cycles of, an Nth pixel of the second line of image data 304, where N is a number from 1 to L.

The synchronizer circuit 212 outputs received pixels with a selected delay, horizontally synchronizing Output 1 312 with Output 2 314, avoiding the described horizontal delay mismatch. For example, the synchronizer circuit 212 may delay providing pixels to the FCP 2 block 210 by a number of cycles corresponding to a horizontal delay added by the processing blocks (such as 206, or 204 and 206) that are selectively bypassed in the path to Output 2. In an example, the NSF 204 and the GLBCE block 206 each add a horizontal delay of 25 cycles. If no processing blocks are bypassed, the synchronizer circuit 212 delays a pixel by zero cycles before providing the pixel to the FCP 2 block 210. If the GLBCE block 206 is bypassed, the synchronizer circuit 212 delays a pixel by 25 cycles before providing the pixel to the FCP 2 block 210. If both the NSF 204 and the GLBCE block 206 are bypassed, the synchronizer circuit 212 delays a pixel by 50 cycles before providing the pixel to the FCP 2 block 210.

In some examples, different functional blocks introduce different amounts of horizontal delay, or different amounts of horizontal delay from those described herein. In some examples, the FCP 2 block 210 is identical to the FCP 1 block 208. This facilitates making the horizontal delays 314 introduced by the FCP 1 block 208 and the FCP 2 block 210 the same or nearly the same, which simplifies determining the amount of delay for the synchronizer circuit 212 to add. For example, the example given above is provided with the assumption that the horizontal delays 314 introduced by the FCP 1 block 208 and the FCP 2 block 210 are the same or nearly the same.

In some examples, image processing parameters are highly sensitive to image content and are frequently updated by software. Time cost to program software to handle frequent, image-dependent updating can be significant. Accordingly, making the FCP 2 block 210 identical to the FCP 1 block 208 can reduce time cost to configure the VISS 118, by saving configuration time for common functions.

In other examples, the synchronizer circuit 212 may apply a delay to ensure that Output 1 produces a first output for a given pixel or block at substantially the same time that Output 2 produces a second output for the pixel or block despite differences in delay between FCP 1 block 208 and FCP 2 block 210.

Figure 4:
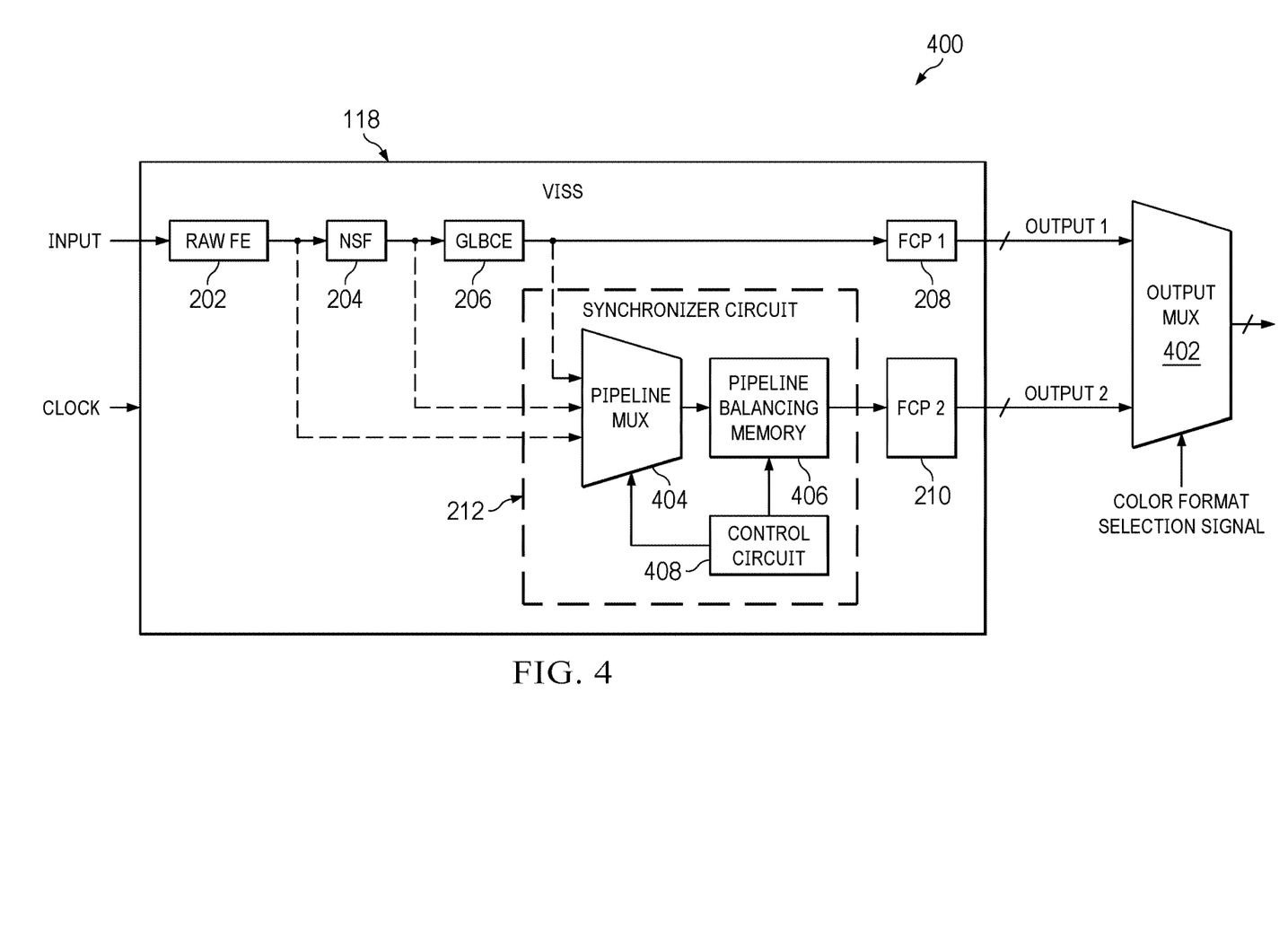
FIG. 4 is a functional block diagram of a VISS system including the example VISS of FIG. 2 with an example implementation of the synchronizer circuit, and an output multiplexer (MUX).

FIG. 4 is a functional block diagram of a VISS system 400 including the example VISS 118 of FIG. 2 with an example implementation of the synchronizer circuit 212, and an output multiplexer (MUX) 402. The synchronizer circuit 212 includes a pipeline MUX 404, a pipeline balancing memory 406, and a control circuit 408. First, second, and third inputs of the pipeline MUX 404 are respectively connected to the first, second, and third inputs of the synchronizer circuit 212. This means that the first, second, and third inputs of the pipeline MUX 404 are respectively connected to the outputs of the raw FE 202, the NSF 204, and the GLBCE block 206. An output of the pipeline MUX 404 is connected to a data input of the pipeline balancing memory 406. An output of the pipeline balancing memory 406 is connected to the output of the synchronizer circuit 212, and accordingly, to the input of the FCP 2 block 210. The first output of the VISS 118 (Output 1) is connected to the first input of the output MUX 402, and the second output of the VISS 118 (Output 2) is connected to the second input of the output MUX 402. The output MUX 402 also includes a control input that receives a color format selection signal. In some examples, the output MUX 402 is implemented using multiple, cascading multiplexers.

The control circuit 408 controls the pipeline MUX 404 to select which input of the synchronizer circuit 212 to pass to the pipeline balancing memory 406. This selects whether a processing pipeline that includes the FCP 2 block 210 will bypass the GLBCE block 206, or the NSF 204 and the GLBCE block 206.

The control circuit 408 also determines a horizontal delay (such as a number of clock cycles) introduced by respective skippable functional blocks. The control circuit 408 can determine horizontal delays using, for example, a table or other memory, or using logic that can measure horizontal delay. The control circuit 408 controls the pipeline balancing memory 406 to store pixels received via the pipeline multiplexer 404 for the determined horizontal delay, and then to output the delayed pixels (processed pixel data) to the FCP 2 block 210. This enables a pixel received by the VISS 118 to complete VISS 118 processing and be output by the FCP 1 block 208 at the same time (or nearly the same time) that a corresponding pixel from a same line or different line of image data completes VISS 118 processing and is output by the FCP 2 block 210, regardless of which internal pipeline blocks of the VISS 118 are bypassed. In other words, a pixel from a first line of image data is provided by Output 1 in horizontal synchrony with a pixel from a second line of image data being provided by Output 2, where the first and second lines of image data may be the same or different.

In some examples, the pipeline balancing memory 406 is a first in first out (FIFO) memory. In an example, pixels output by the raw FE 202 have 16 bits, and it can take up to 256 cycles for a pixel output by the raw FE 202 to be received by the input of the FCP 1 block 208. In this example, the pipeline balancing memory 406 is sized to store up to 256×16=4096 bits. In some examples, the pipeline balancing memory 406 has a different size.

In some examples, Output 1 and Output 2 can each simultaneously provide multiple different color format versions of processed pixels. For example, Output 1 and Output 2 can each output processed pixels in one or more color spaces such as RGB, YUV, or HSV. The output MUX 402 outputs signals in selected color formats, processed and provided by the FCP 1 or FCP 2 block 208 or 210, in response to the color format selection signal. For example, the output MUX 402 can output YUV8 (Y 8-bit and UV 8-bit from the FCP 1 block 208 for human vision processing, and Y12UV8 (Y 12-bit and UV 8-bit) from the FCP 2 block 210 for machine vision processing. In some examples, a machine vision processing pipeline path uses pixels processed to retain a high dynamic range of pixel intensity, in a Luma or Y color format, for ADAS applications. In some examples, Output 1 includes five color channels, Output 2 includes five color channels, and the output MUX 402 selects between these ten color channels to provide five color channels as an output of the VISS system 400. In some examples, any combination of Output 1 and Output 2 color channels can be selected to produce the output of the VISS system 400, such as three color channels from Output 1 and two color channels from Output 2, or one color channel from Output 1 and four color channels from Output 2.

Figure 5:
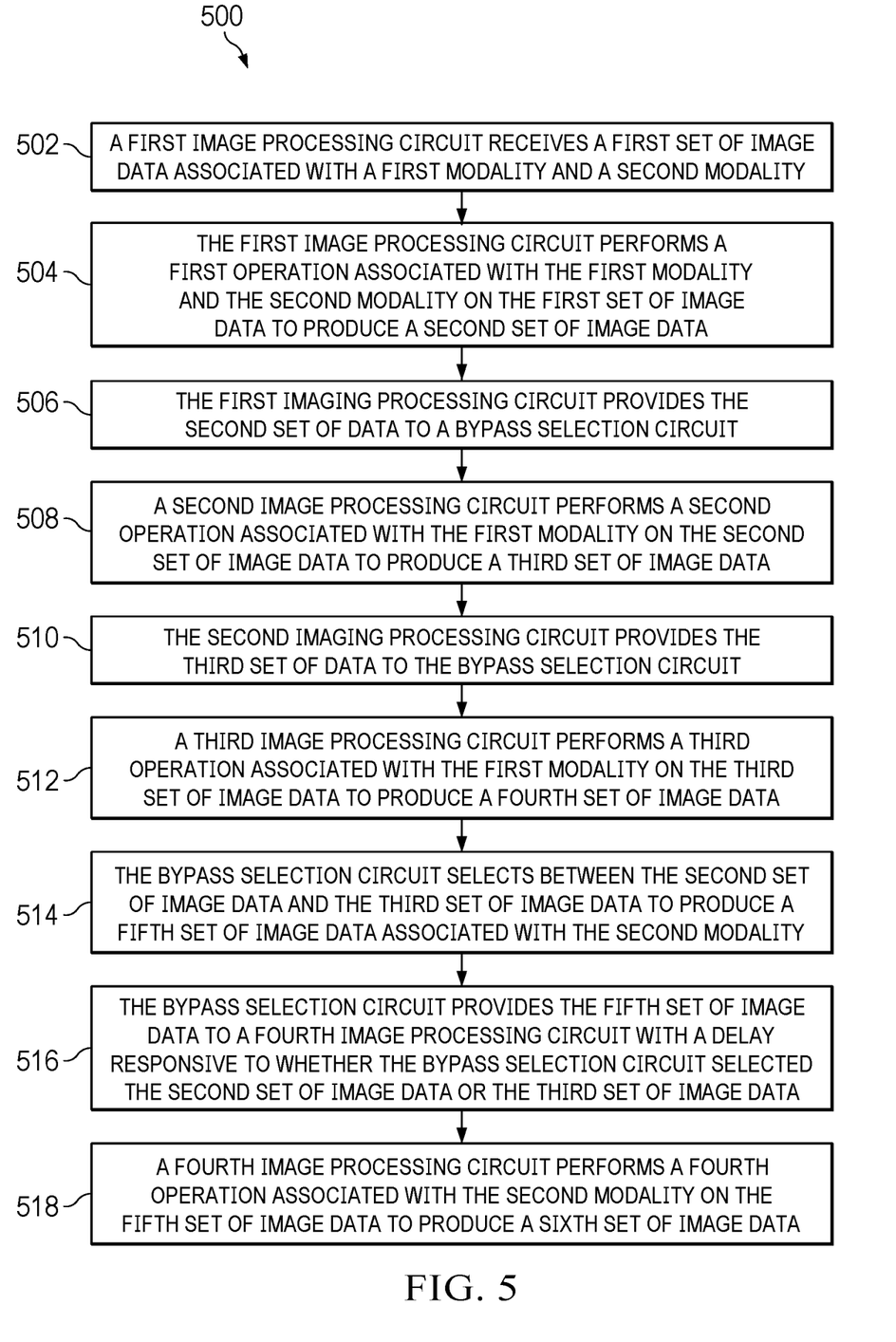
FIG. 5 is an example process for operating a video imaging subsystem.

FIG. 5 is an example process 500 for operating a video imaging subsystem. In step 502, a first image processing circuit receives a first set of image data associated with a first modality and a second modality. In an example, the first modality is human vision processing and the second modality is machine vision processing. In an example, the first imaging processing circuit is the raw FE 202. In step 504, the first image processing circuit performs a first operation associated with the first modality and the second modality on the first set of image data to produce a second set of image data. In step 506, the first imaging processing circuit provides the second set of data to a bypass selection circuit. In step 508, a second image processing circuit performs a second operation associated with the first modality on the second set of image data to produce a third set of image data. In an example, the second image processing circuit is the NSF 204, or the NSF 204 and the GLBCE 206. In step 510, the second imaging processing circuit provides the third set of data to the bypass selection circuit. In step 512, a third image processing circuit performs a third operation associated with the first modality on the third set of image data to produce a fourth set of image data. In step 514, the bypass selection circuit selects between the second set of image data and the third set of image data to produce a fifth set of image data associated with the second modality. In step 516, the bypass selection circuit provides the fifth set of image data to a fourth image processing circuit with a delay responsive to whether the bypass selection circuit selected the second set of image data or the third set of image data. In step 518, the fourth image processing circuit performs a fourth operation associated with the second modality on the fifth set of image data to produce a sixth set of image data.

In some examples, a synchronizer circuit 212 and FCP 2 210 as described herein enables a single image data input stream to produce dual synchronized, processed output streams. Further, for producing dual/different outputs, some or all of input bandwidth, device area usage, part cost, and power usage can be reduced. In some examples, a VISS 118 as described can be included in an image processing IC 130 with little or no rearrangement of circuits in other functional blocks.

Figure 6:
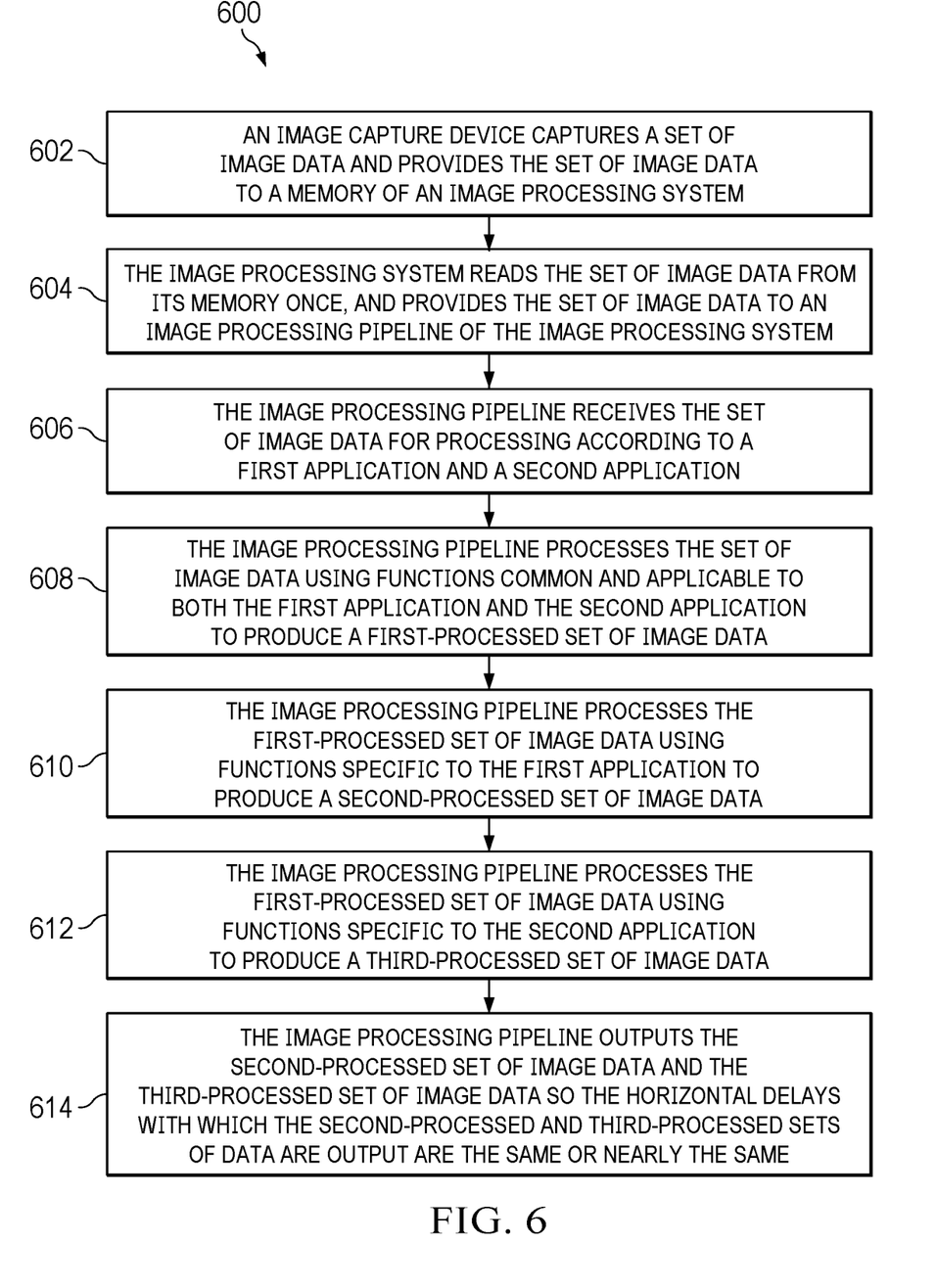
FIG. 6 is an example process 600 for operating a video imaging subsystem.

FIG. 6 is an example process 600 for operating a video imaging subsystem. In step 602, an image capture device captures a set of image data and provides the set of image data to a memory of an image processing system. In step 604, the image processing system reads the set of image data from its memory once, and provides the set of image data to an image processing pipeline of the image processing system. (In some examples, multiple reads can be used. In some examples, reading from memory once can correspond to multiple reads being performed, so that respective portions of memory are read once. In some examples, some or all respective portions of memory are read, or are each read, multiple times.)

In step 606, the image processing pipeline receives the set of image data for processing according to a first application and a second application. In an example, the first application is human vision processing and the second application is machine vision processing. In step 608, the image processing pipeline processes the set of image data using functions common and applicable to both the first application and the second application to produce a first-processed set of image data.

In step 610, the image processing pipeline processes the first-processed set of image data using functions specific to the first application to produce a second-processed set of image data. In step 612, the image processing pipeline processes the first-processed set of image data using functions specific to the second application to produce a third-processed set of image data. In step 614, the image processing pipeline outputs the second-processed set of image data and the third-processed set of image data so the horizontal delays with which the second-processed and third-processed sets of data are output are the same or nearly the same. Accordingly, the image processing system is able to read image data once to provide dual, differently-processed outputs while avoiding or minimizing an increase in image processing pipeline delay.

Modifications are possible in the described examples, and other examples are possible within the scope of the claims.

In some examples, the FCP 1 and FCP 2 blocks 208 and 210 output processed pixels in other color formats than those described above.

In some examples, circuitry other than a multiplexer can be used to select an output from among multiple inputs.

In some examples, a multiplexer or other circuitry providing one or more selected inputs as output(s) is referred to as switching circuitry or data selection circuitry.

In some examples, the pipeline multiplexer 404 is referred to as bypass selection circuitry.

In some examples, switching circuitry, data selection circuitry, or bypass selection circuitry includes the pipeline multiplexer 404 and the control circuit 408.

In some examples, a demosaicing and color processing pipeline includes different functionality, or functionality organized in a different order or in different pipeline blocks, than described above with respect to the VISS 118.

In some examples, different functional blocks (or portions of functional blocks) are configured to be selectable to be bypassed than those described herein with respect to the VISS 118.

In some examples, an image processor includes different functionality, or functionality organized in different functional blocks, than described above with respect to the VPAC 104 or the IC 130.

In some examples, FCP 2 210 is not identical to and/or performs different functions than FCP 1 208.

In some examples, FCP 2 210 is clock gated.

In some examples, a VISS 118 includes a second synchronizer circuit, with inputs connected to outputs of the Raw FE 202, the NSF 204, and the GLBCE 206, and an output connected to the input of the FCP 1 208. In some examples, the second synchronizer circuit includes a second pipeline MUX, a second pipeline balancing memory, and a second control circuit. Inputs of the second pipeline MUX are connected to inputs of the second synchronizer circuit, and an output of the second pipeline MUX is connected to an input of the second pipeline balancing memory. Outputs of the second control circuit are connected to control inputs of the second pipeline MUX and the second pipeline balancing memory. An output of the second pipeline balancing memory is connected to an output of the second synchronizer circuit. In some examples, a second synchronization circuit allows different paths in a VISS 118 pipeline to bypass different processing blocks of the pipeline.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

A device that is "configured to" perform a task or function may be configured (for example, programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (for example, a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include the replaced components to provide functionality at least partially similar to functionality available prior to the component replacement.

The term "couple" is used throughout the specification. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

While certain elements of the described examples may be included in an IC and other elements are external to the IC, in other examples, additional or fewer features may be incorporated into the IC. In addition, some or all of the features illustrated as being external to the IC may be included in the IC and/or some features illustrated as being internal to the IC may be incorporated outside of the IC. As used herein, the term "IC" means one or more circuits that are: (i) incorporated in/over a semiconductor substrate; (ii) incorporated in a single semiconductor package; (iii) incorporated into the same module; and/or (iv) incorporated in/on the same PCB.

Unless otherwise stated, "about," "approximately," or "substantially" preceding a value means +/−10 percent of the stated value, or, if the value is zero, a reasonable range of values around zero.

What is claimed is:

1. An integrated circuit (IC) comprising:
a first image processing block including an input and an output, the input of the first image processing block configured to receive raw image data;
a second image processing block including an input and an output, the input of the second image processing block coupled to the output of the first image processing block;
a third image processing block including an input and an output, the input of the third image processing block coupled to the output of the second image processing block;
a fourth image processing block including an input and an output;
a data selection circuitry including a first input, a second input, and an output, the first input of the data selection circuitry coupled to the output of the first image processing block, and the second input of the data selection circuitry coupled to the output of the second image processing block; and
a pipeline memory including a control input, a data input, and an output, the data input of the pipeline memory coupled to the output of the data selection circuitry, and the output of the pipeline memory coupled to the input of the fourth image processing block.

2. The IC of claim 1, wherein the pipeline memory is configured to output processed pixel data with a delay responsive to whether the data selection circuitry outputs processed pixel data received from the first image processing block or processed pixel data received from the second image processing block.

3. The IC of claim 1, wherein the pipeline memory is configured to output processed pixel data with a delay, the delay determined so that an absolute value of a difference between a horizontal delay of an output of the third image processing block and a horizontal delay of an output of the fourth image processing block is less than or equal to a horizontal blanking period duration of the raw image data received by the first image processing block.

4. The IC of claim 1, further including:
a shared memory; and
one or more of: a lens distortion correction circuit, a noise filter circuit, a multi-scalar circuit, or a direct memory access circuit.

5. The IC of claim 1 incorporated into a system, the system further including:
a shared memory coupled to the first image processing block; and
an image capture device coupled to the first image processing block;
wherein in a first mode, the first image processing block is configured to receive the raw image data from the shared memory; and
wherein in a second mode, the first image processing block is configured to receive the raw image data from the image capture device.

6. The IC of claim 1, wherein the fourth image processing block is a copy of the third image processing block.

7. The IC of claim 1,
wherein the data selection circuitry is a first data selection circuitry and the pipeline memory is a first pipeline memory;
further including a second data selection circuitry including a first input, a second input, and an output, the first input of the data selection circuitry coupled to the output of the first image processing block, and the second input of the data selection circuitry coupled to the output of the second image processing block; and
a second pipeline memory including a control input, a data input, and an output, the data input of the second pipeline memory coupled to the output of the second data selection circuitry, and the output of the pipeline memory coupled to the input of the third image processing block.

8. An integrated circuit (IC) comprising:
a first image processing block including an input and an output, the input of the first image processing block configured to receive raw image data;
a second image processing block including an input and an output, the input of the second image processing block coupled to the output of the first image processing block;
a third image processing block including an input and an output, the input of the third image processing block coupled to the output of the second image processing block;
a fourth image processing block including an input and an output; and
a synchronizer circuit including a first input, a second input, and an output, the output of the first image processing block coupled to the first input of the synchronizer circuit, the output of the second image processing block coupled to the second input of the synchronizer circuit, and the output of the synchronizer circuit coupled to the input of the fourth image processing block;
wherein the synchronizer circuit is configured to output either processed pixel data received from the first image processing block or processed pixel data received from the second image processing block; and
wherein the synchronizer circuit is configured to output processed pixel data with a delay responsive to whether the synchronizer circuit outputs the processed pixel data received from the first image processing block or the processed pixel data received from the second image processing block.

9. The IC of claim 8,
wherein the first image processing block is configured to perform on raw or processed pixel data one or more of wide dynamic range merge, defect pixel correction, lens shading correction, decompounding, or white balance;

wherein the second image processing block is configured to perform on processed pixel data one or more of a spatial noise filter or a tone mapping;

wherein the third image processing block and the fourth image processing block are each configured to perform on processed pixel data one or more of demosaicing, color correction, color space conversion, or gamma conversion.

10. The IC of claim 8,
wherein the synchronizer circuit includes a third input;
further including a fifth image processing block including an input and an output, the input of the fifth image processing block coupled to the output of the second image processing block, the output of the fifth image processing block coupled to the input of the third image processing block and to the third input of the synchronizer circuit.

11. The IC of claim 10, wherein the second image processing block performs on processed pixel data a spatial noise filter, and the fifth image processing block performs on processed pixel data a tone mapping.

12. The IC of claim 8, wherein the delay is determined so that an absolute value of a difference between a horizontal delay of an output of the third image processing block and a horizontal delay of an output of the fourth image processing block is less than or equal to a horizontal blanking period duration of the raw image data received by the first image processing block.

13. The IC of claim 8, wherein the fourth image processing block is a copy of the third image processing block.

14. The IC of claim 8, further including:
a shared memory; and
one or more of: a lens distortion correction circuit, a noise filter circuit, a multi-scalar circuit, or a direct memory access circuit.

15. The IC of claim 8,
wherein the synchronizer circuit is a first synchronizer circuit;
further including a second synchronizer circuit having a first input, a second input, and an output;
the output of the first image processing block coupled to the first input of the second synchronizer circuit, the output of the second image processing block coupled to the second input of the second synchronizer circuit, and the output of the second synchronizer circuit coupled to the input of the third image processing block;
wherein the second synchronizer circuit is configured to output either processed pixel data received from the first image processing block or processed pixel data received from the second image processing block; and
wherein the second synchronizer circuit is configured to output processed pixel data with a delay responsive to whether the second synchronizer circuit outputs the processed pixel data received from the first image processing block or the processed pixel data received from the second image processing block.

16. A video processing system comprising:
an image capture device including a sensor and a color filter array;
a display; and
an integrated circuit (IC) including a data input and a data output, the data input of the IC coupled to and configured to receive image data from the image capture device, the data output of the IC coupled to the display, the IC further including:

a first image processing block including an input and an output, the input of the first image processing block coupled to the data input of the IC;
a second image processing block including an input and an output, the input of the second image processing block coupled to the output of the first image processing block;
a third image processing block including an input and an output, the input of the third image processing block coupled to the output of the second image processing block;
a fourth image processing block including an input and an output;
a data selection circuitry including a first input, a second input, and an output, the first input of the data selection circuitry coupled to the output of the first image processing block, the second input of the data selection circuitry coupled to the output of the second image processing block, the output of the data selection circuitry coupled to the input of the fourth image processing block; and
a pipeline memory including a control input, the pipeline memory coupled to the output of the data selection circuitry and to the input of the fourth image processing block;
wherein one or more of the third image processing block and the fourth image processing block is coupled to the data output of the IC.

17. The video processing system of claim 16, wherein the pipeline memory is configured to output processed pixel data with a delay responsive to whether the data selection circuitry outputs processed pixel data received from the first image processing block or processed pixel data received from the second image processing block.

18. The video processing system of claim 16, wherein the pipeline memory is configured to output processed pixel data with a delay, the delay determined so that an absolute value of a difference between a horizontal delay of an output of the third image processing block and a horizontal delay of an output of the fourth image processing block is less than or equal to a horizontal blanking period duration of the image data received by the first image processing block.

19. The video processing system of claim 16,
the IC including a shared memory coupled to the data input of the IC and to the first image processing block;
wherein in a first mode, the first image processing block is configured to receive the image data from the shared memory; and
wherein in a second mode, the first image processing block is configured to receive the image data from the image capture device.

20. The IC of claim 16,
wherein the data selection circuitry is a first data selection circuitry and the pipeline memory is a first pipeline memory;
the IC further including:
a second data selection circuitry including a first input, a second input, and an output, the first input of the data selection circuitry coupled to the output of the first image processing block, and the second input of the data selection circuitry coupled to the output of the second image processing block; and
a second pipeline memory including a control input, a data input, and an output, the data input of the second pipeline memory coupled to the output of the second data selection circuitry, and the output of the pipeline memory coupled to the input of the third image processing block.

\* \* \* \* \*